US006529856B1

(12) United States Patent
Fischer et al.

(10) Patent No.: US 6,529,856 B1
(45) Date of Patent: Mar. 4, 2003

(54) DIAGNOSTIC METHOD FOR PRINTING SYSTEMS

(75) Inventors: Georg Fischer, Friedberg (DE); Günter Steininger, Karlsfeld (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 09/786,500

(22) PCT Filed: Sep. 3, 1999

(86) PCT No.: PCT/EP99/06488

§ 371 (c)(1),
(2), (4) Date: Mar. 2, 2001

(87) PCT Pub. No.: WO00/14606

PCT Pub. Date: Mar. 16, 2000

(30) Foreign Application Priority Data

Sep. 3, 1998 (DE) .......................................... 198 40 202

(51) Int. Cl.[7] .......................... G06F 11/00; G03G 15/00
(52) U.S. Cl. .......................... 702/186; 702/183; 399/82
(58) Field of Search ........................ 702/186, 182–185; 714/2, 20, 46, 57; 358/1.9, 1.14, 403; 399/11, 82

(56) References Cited

U.S. PATENT DOCUMENTS

| 5,038,319 | A | | 8/1991 | Carter et al. | |
|---|---|---|---|---|---|
| 5,063,535 | A | | 11/1991 | Jacobs et al. | |
| 5,305,056 | A | * | 4/1994 | Salgado et al. | ................ 399/11 |
| 5,825,989 | A | * | 10/1998 | Sonty et al. | ................ 358/1.14 |

OTHER PUBLICATIONS

Japanese Abstract, 09073163, Publication Date: Mar. 18, 1997, "Diagnostic Method and Device for Photographic Processing Device".

* cited by examiner

*Primary Examiner*—Bryan Bui
(74) *Attorney, Agent, or Firm*—Schiff Hardin & Waite

(57) ABSTRACT

In order to analyze errors in a high-performance printing system, it is common to transfer the system environment to a service printing system and to conduct an analysis there. The aim of the invention is to simplify and accelerate this diagnosis. To this end, only the data, especially with regard to resources, which had been required by the printing system during a print job that caused an error condition is gathered, transferred and analyzed.

9 Claims, 4 Drawing Sheets

DIAGNOSTIC METHOD FOR PRINTING SYSTEMS

BACKGROUND OF THE INVENTION

1. Field of the Invention

The present invention is directed to a data acquisition and diagnostic method for printing systems. It is particularly directed to a diagnostic method for high-performance printing systems wherein data streams from the most diverse originating sources are conducted to a printer via a printer control computer, what is referred to as a printer server.

2. Description of the Related Art

In such printing systems, the printer server has the job of converting print data streams of various operating languages such as SPDS/AFPDS data streams, LCDS data streams or PCL data streams into a specific data stream allocated to the respective printer, so that the latter prints the incoming print data error-free.

The publication, "The World of Printers, Océ printing Systems GmbH, Edition 3a (1998), ISBN 3-00-001081-5, pages 12-1 through 12-8 describes printing systems wherein a plurality of printers (Pagestream®) form a printing system together with a print server (PRISMA®). The print server can thereby be operated with a control program (Prisma®+ LCDS). In addition to enabling already existing printing solutions for host and network environments this control program is specifically suited for also enabling autonomous printing from existing environments (Xerox® applications).

Given high-performance printing systems that print 50 DIN A4 pages and more, problems also occur during printing whose causes are to be found in system environments, particularly in the various control programs of the control computer that cooperate with one another or in data constellations.

When such an error occurs, then it is necessary to analyze the printing system very precisely. Such an analysis usually does not ensue on site at the system at which the error occurred but in service labs that are specialized for this purpose and that are usually at a great distance from the location of the occurrent error. For this purpose, it is therefore necessary to transmit the system environment onto the analysis environment of the service lab exactly from the location of the occurrent error insofar as possible.

To that end, great quantities of data of the system environment, usually a few x-thousand resources like fonts, images, forms, logos, etc., are collected on data carriers on site and then re-recorded onto the service PC at the analysis location. What is thereby disadvantageous is that, due to the processing (transmission, copying, conversion) of these great quantities of data, a relatively long time, sometimes a few hours only for the data transfer, is required.

Japanese Patent Document JP-A-09073163 discloses a diagnostic method and a diagnostic apparatus for a photographic device, whereby device data are transmitted from a device controller to an essentially identical device controller located outside the device for diagnostic purposes. The diagnosis of possible errors that have occurred in the device or, respectively, in the controller thereof then ensues in this second device controller.

SUMMARY OF THE INVENTION

An object of the invention is to offer a method that enables a simple and fast diagnosis of a high-performance printing system.

It has been inventively recognized that, for successful reproduction of the system environment and, thus, for the diagnosis thereof in a high-performance printing system, it suffices to store and analyze those data, particularly resources, that were required by the printing system given a specific print job that caused an error condition. Many other resource data that are in fact stored on the faulty printing system but are not employed during the course of the print job causing the error need not be transferred onto the service control computer.

Inventively, the data of the print data stream that comprise a multitude of variable control information, a multitude of variable print data and a specific set of resources are therefore registered or, respectively, stored in the print control computer. In particular, the resource calls of data stored in the print control computer that ensue in the print data stream of the print job are also registered. The registered data are then analyzed and only those control information, data, calls and resource data that were in fact used in the appertaining print job are respectively selectively collected and stored. Multiple calls are filtered out, so that the data volume to be subsequently sent to the service computer of the analysis location can be reduced to a minimum. In particular, those resource data that are stored on the print control computer and that were accessed in the print job under examination are acquired in the collecting event.

Instead of employing data quantities on the order of magnitude of several hundred megabytes that cover all resources of a print computer, including all bit maps generated by the user, the invention makes it possible to employ selected data quantities of a few x kilobytes. Surprisingly, the system environment can be imaged onto the service environment exactly enough with such a reduced data quantity.

It is especially advantageous to proceed in two steps for the selective collecting and storing, whereby the data employed in the faulty print job are registered in the first step and these registered data are analyzed in the second step, and multiply occurring, identical data are filtered out and respectively stored only once.

BRIEF DESCRIPTION OF THE DRAWINGS

Exemplary embodiments of the invention are described below. Further advantages and effects of the invention become clear as a result thereof.

DETAILED DESCRIPTION OF THE PREFERRED EMBODIMENTS

Figure 1:
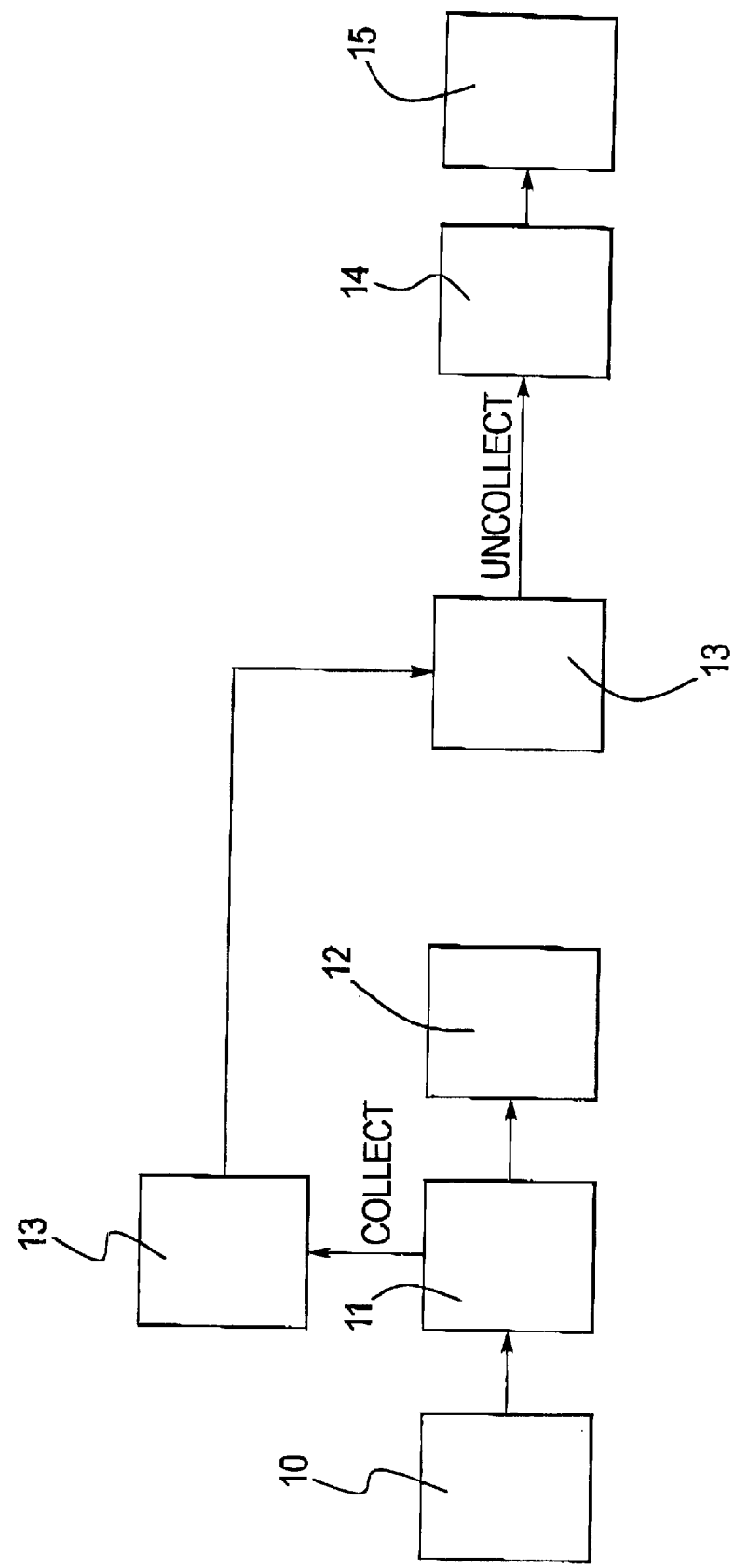
FIG. 1 is a functional block diagram illustrating the principle of an inventive diagnostic method.

FIG. 1 shows a first printing system 10, 11 and 12 that receives print data from a print data source 10, for example a host computer, a network, a tape or the like, and transmits them to a print control computer 11 that converts the data into a printer language adapted to the printer 12. The data stream of the print data source 10 can, for example, contain PCL data streams specified by HP® or data streams specified by Xerox® that are then respectively converted by the print computer 11 into an IPDS data stream specified by IBM® that the printer 12 can process. Further details of such a printing system can be derived from the publication, "The World of Printers, Océ printing Systems GmbH, Edition 3a (1998), ISBN 3-00-001081-5, pages 12-1 through 12-8. This publication as well as the corresponding version in German, ISBN 3-00-001019-X, pages 12-1 through 12-8 is herewith incorporated by reference into the present specification.

When an error occurs in such a high-performance printing system, then it must usually be examined and analyzed by a service technician specifically qualified for this purpose. To that end, the system environment of the printing system 10, 11 and 12 is re-recorded onto a printing system that, for example, is set up in a service laboratory, being transferred via a data carrier 13 or, respectively, via a modem or a specific data line given remote diagnosis. The service computer 14 is thereby largely identical to the print control computer 14, and the service printer 15 is thereby largely identical to the printer 12. Even though a great quantity of data is stored on the print control computer (print server 11), it suffices to load or, respectively, to transfer those data files on the service computer 14 via the data carrier 13 (diskette or, respectively, modem) that are relevant in conjunction with the test print job to be examined and that produced the errors in the printing system 10, 11 and 12. To this end, the allocated data of this error-defining or, respectively, error-triggering print job are collected (collecting event) in the print control computer 11, and only these collected data are transmitted to the service system 14 and 15. The term "error-defining" indicates a specific print job in general that is related to an error condition of the printing system or, respectively, places it into an error condition. Error documents are thereby collected. Accordingly, information about the resources employed are extracted from trace data files that are made available by various applications within the print control computer 11, and the overall results are stored compressed on the data carrier 13. The resource list that has thus arisen serves as control medium in order to generated a collection of utilized resources. The error that has occurred in the printing system 10, 11 and 12 can then be completely replicated by the development or, respectively, service personnel on the service printing system using this collection of resources.

The collection of resources store don the data carrier 13, for example a diskette or tape, can also be stored in the control computer 11 for protection. Instead of being transmitted via a physical medium 13, the resource collection can also, for example, be directly transmitted to the service system 14 and 15 via a network connection of via modem. A program-controlled device "uncollect" can be provided in the service system, compressed parts of the collection or parts thereof that have been encoded in some other way being reconstructed on the service system therewith.

Figure 2:
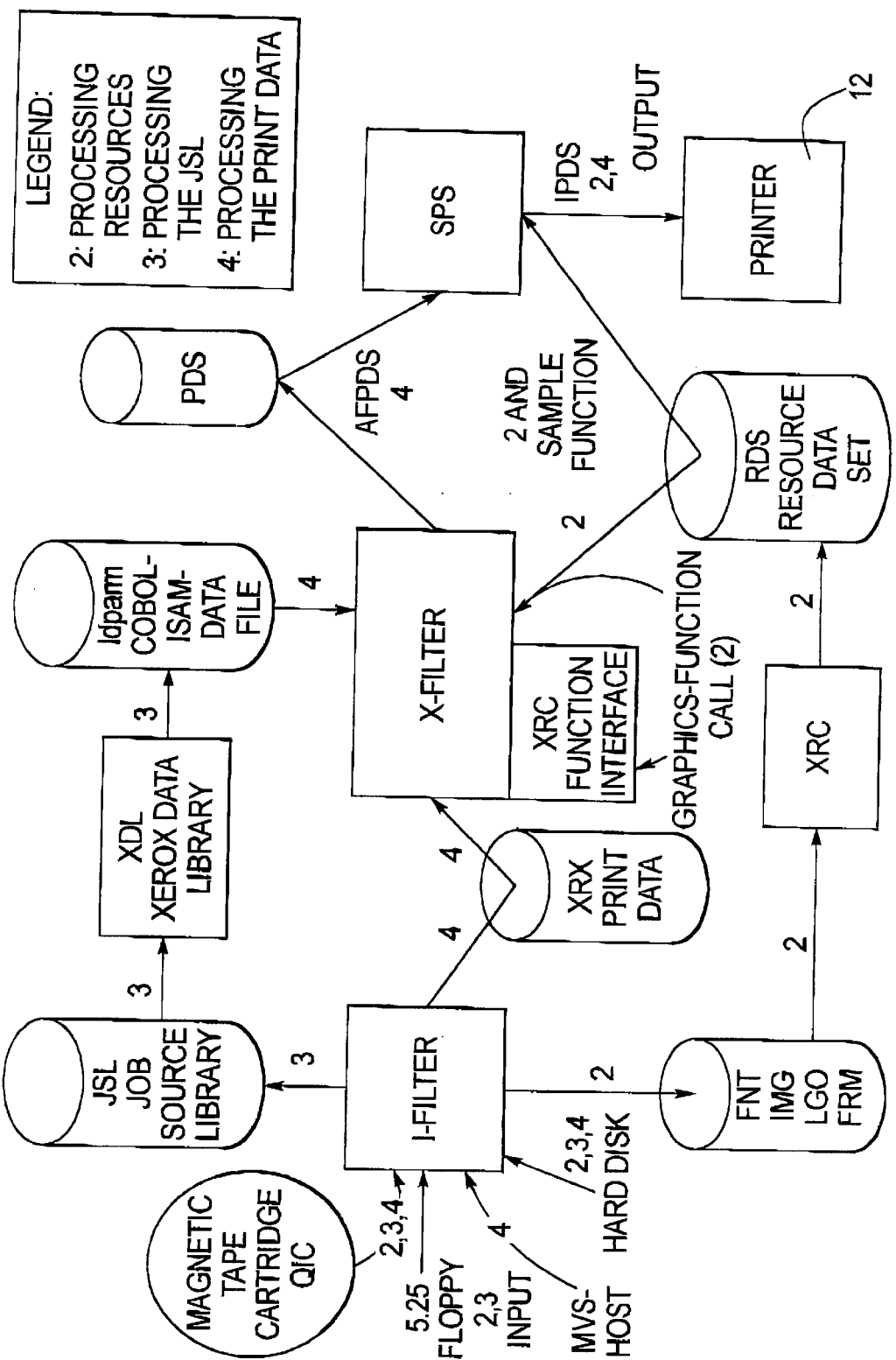
FIG. 2 is a chart showing the data flow in a high-performance printing system.

Before the collection function is discussed again with reference to FIG. 3, how the print data stream is processed within the print control computer 11 in a normally functioning printing system shall be described on the basis of FIG. 2.

The following reference numerals are thereby employed:

2: processing of resource data

3: processing of job source library data

4: processing the print data.

A data stream of a print application is composed, for example, of JSL data (job source library data) in the Xerox format as well as of resource data such as fonts (FNT), images (IMG), logos (LGO) and form data (FRM). These resource data are also printer language specific, i.e. specifically for the aforementioned Xerox print data stream. Data that are played into the I-filter (input or conversion filter) at the input side (input) from a magnetic tape, a diskette, a host computer or a hard disk are separated therein according to JSL data, variable XRX print data and resource data. The JSL data are copied into the job source library (JSL), subsequently compiled by Xerox Data Library (XDL) and deposited in the COBOL-ISAM 1 dparm datafile before the X-filter interprets them for print conversion. Within the print control computer, the resource data are deposited in a resource dataset (RDS) after the conversion by the Xerox resource converter (XRC). In the X-filter, the data of the print data stream are recompiled to form a shared job, deposited as print dataset (PDS) and compiled via the module SPS (Siemens print server) into an IPDS data stream (Intelligent Agent Printer Data Stream) that can be read by the printer 12.

Insofar as function calls for graphics or the like ensue within the Xerox print data stream, this ensues in the XRX function interface that is associated with the X-filter.

Figure 3:
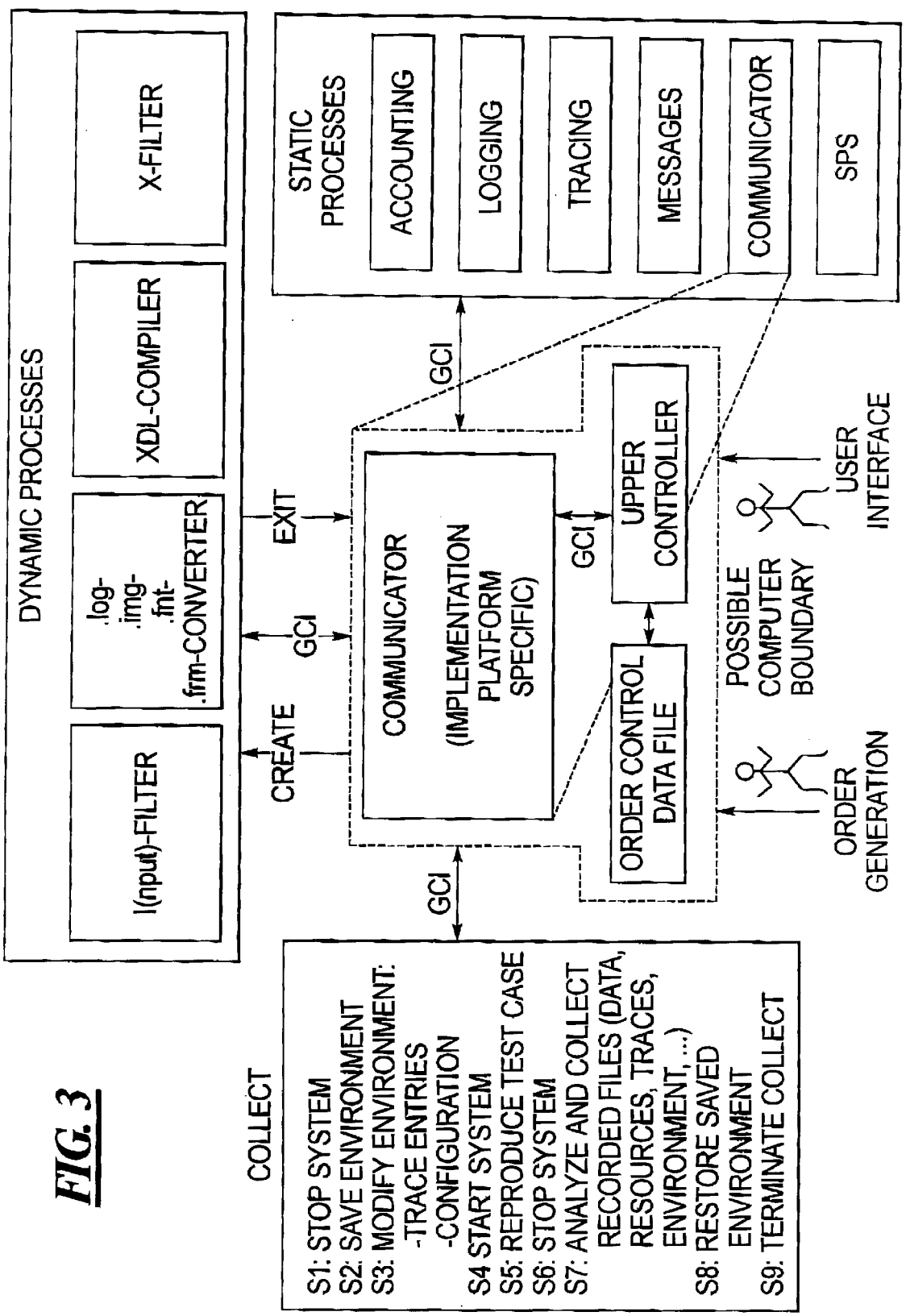
FIG. 3 is a block diagram showing control components in a print control computer.

FIG. 3 shows how these processes can be program-internally controlled. A central component part of the printer control is a communicator that has intercourse with its environment via the global communication interface (GCI). The communicator controls all dynamic and static processes in the various processing units (filter, compiler, converter) as well as the static processes of accounting, logging, tracing, messages as well as the output via SPS.

A job is generated via a job control datafile and is potentially edited by the user via the job controller and supplied to the communicator via the global communication interface. The latter then hands over the print data to the various modules according to FIG. 2.

When an error occurs during the course of the printing event, then the "messages" module first outputs an error message to the user interface via the GCI. Dependent on the gravity of the error, the entire printing system can thereby also be automatically stopped. The user has the option of stopping the printing event at any time and calling the "collect" program. As shown in FIG. 3, this "collect" program stored in a memory implements the following functions:

First, the system is stopped, then all environment parameters are stored (S2) as a backup copy and then the environment parameters are modified, for example specific TRACE entries are undertaken for tracking parameters and data or configuration settings are modified (S3).

Subsequently, the system is restarted (S4), the test case is reproduced (S5), i.e. the print job or a part thereof whereat the error occurred is processed anew, and the system is then stopped again (S6). All recorded datafiles are then analyzed (variable print data, resource data, trace data, environment data . . . ) and collected, i.e. only those that were a component part of this print job are selectively stored.

Subsequently, the original enviromnent parameters (see step S2) are restored (S8) and the "collect" program is ended (S9).

The program-controlled "collect" device collects all resources directly and indirectly used by the print process. "Collect" thereby opens and reads the directly employed overlay resource datafiles and, for example, searches for entries that in turn call other resources and collects these. Examples of resource calls are "include page overlay" (IPO), "include page segment" (IPS), "map coded font" format 1 and 2 (MCF), "map medium overlay" (MMO), "map page overlay" (MPO) and "map page segment" (MPS).

Figure 4:
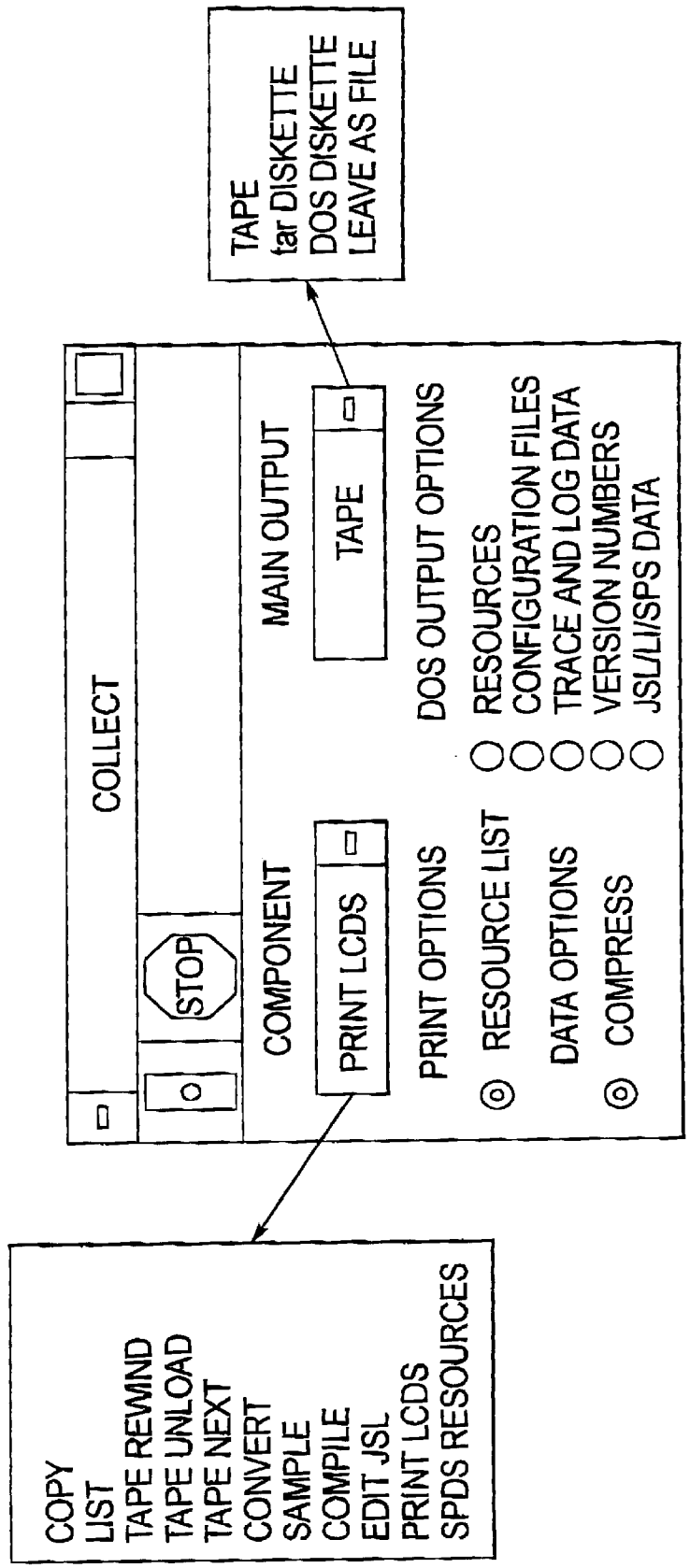
FIG. 4 is the menu call of an inventive data collecting program.

FIG. 4 shows the menu call of the "collect" program. When called, the start button (traffic light symbol) is activated and the stop button is deactivated. The component control enables the selection of a dynamic process for tracing with an individual selection list. The output control enables the selection of an output data carrier with an individual selection list. A tape, a diskette, a DOS diskette or a datafile can thereby be selected as output medium. The option buttons are either turned on or off. When the print options resource list button is turned on, then a list of the resources that have been found is printed out at the end of the "collect" program. The collected data can be compressed with the compress button and stored in a datafile. The data indicated in the corresponding fields can be copied onto a DOS diskette at the program termination with the DOS output option buttons. After the selection of all options, start is clicked and the program steps S1 through S9 begin.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for acquiring data of a printing system, in which a print data stream is conducted from a print data source to a printer via a print control computer, comprising the steps of:
   a) providing the print data stream composed of a plurality of variable print data and of a plurality of variable control information and of a specific quantity of resource data,
   b) performing calls of resources in the print data stream of a print job, said calls being stored in the print control computer,
   c) for diagnosis selectively collecting and storing at least one of said control information and resource data that are sent to the print control computer given an error-defining print job or made available by this, and the selectively stored data being made available for transmission to a second print control computer.

2. A method according to claim 1, wherein the selective collecting of the data step ensues in that, first, the data employed by the print control computer during the running of a print job are recorded, the data are then stored in the print control computer, a subsequent analysis in the print control computer is carried out to see which data were multiply employed, and the multiply employed data are respectively offered only once for the transmission to the second print control computer.

3. A method according to claim 1, further comprising the step of: compressing for transmission the data offered for transmission.

4. A method according to claim 1, further comprising the step of: storing, on the print control computer at least a part of the data provided for the transmission.

5. A method according to claim 1, wherein the transmission ensues via a diskette or a tape.

6. A method according to claim 1, wherein the transmission ensues via a data network.

7. A method according to claim 1, wherein the method is implemented in a control program of the first print control computer.

8. A method according to claim 1, wherein the resource data comprise at least one of fonts, images, logos and overlays.

9. A method for diagnosis of a printing system, in which a print data stream is conducted from a print data source to a printer via a print control computer, comprising the steps of:
   a) providing the print data stream is composed of a plurality of variable print data, of a plurality of variable control information and of a specific quantity of resource data,
   b) performing calls of resources in the print data stream of a print job, said calls being stored in the print control computer,
   c) for diagnosis, collecting and storing at least one of the control information and resource data that are sent to the print control computer given an error-defining print job or made available by this, and the selectively stored data being made available for transmission to a second print control computer, and
   d) supplying the selectively stored data to a second print control computer for error analysis.

* * * * *